United States Patent
Kang et al.

(10) Patent No.: US 10,041,605 B2
(45) Date of Patent: Aug. 7, 2018

(54) PNEUMATIC VALVE FOR VEHICLE

(71) Applicants: HYUNDAI DYMOS INCORPORATED, Seosan-si, Chungcheongnam-do (KR); INZICONTROLS CO., LTD, Siheung-si, Gyeonggi-do (KR)

(72) Inventors: Sin Jeong Kang, Hwaseong-si (KR); Sung Hoon Kim, Seoul (KR); Jong Dae Im, Ansan-si (KR); Taek Seung Kim, Seoul (KR); Kwang Bok Park, Siheung-si (KR); Jeong Dae Kim, Incheon (KR)

(73) Assignees: HYUNDAI DYMOS INCORPORATED, Seosan-si, Chungcheongnam-Do (KR); INZICONTROLS CO., LTD., Siheung-si, Gyeonggi-Do (KR)

( * ) Notice: Subject to any disclaimer, the term of this patent is extended or adjusted under 35 U.S.C. 154(b) by 39 days.

(21) Appl. No.: 15/283,949

(22) Filed: Oct. 3, 2016

(65) Prior Publication Data
US 2017/0102090 A1    Apr. 13, 2017

(30) Foreign Application Priority Data
Oct. 8, 2015 (KR) .................. 10-2015-0141268

(51) Int. Cl.
| F16K 11/065 | (2006.01) |
| F16K 31/06 | (2006.01) |
| B60N 2/90 | (2018.01) |

(52) U.S. Cl.
CPC .......... *F16K 31/0696* (2013.01); *B60N 2/914* (2018.02); *F16K 31/0606* (2013.01); *F16K 31/0627* (2013.01); *F16K 31/0679* (2013.01)

(58) Field of Classification Search
CPC ............. F16K 31/0696; F16K 31/0606; F16K 31/0627; F16K 31/0629; F16K 31/0679; B60N 2/914
See application file for complete search history.

(56) References Cited

U.S. PATENT DOCUMENTS 2,322,911 A * 6/1943 Beam .................. F16K 31/0679
                                                    251/129.1
3,842,860 A * 10/1974 Stampfli ............. F16K 31/0606
                                                    137/596.17
(Continued)

FOREIGN PATENT DOCUMENTS

| JP | 3851654 B2 | 5/1996 |
| JP | 2989095 B2 | 12/1999 |

(Continued)

*Primary Examiner* — Craig Schneider
*Assistant Examiner* — Angelisa L Hicks
(74) *Attorney, Agent, or Firm* — Brinks Gilson & Lione (57) ABSTRACT

The present disclosure provides a pneumatic valve for vehicle. The pneumatic valve includes: a valve housing having a flow passage through which air flows; a core fixed to the center of the flow passage; a plunger that is disposed to face an end of the core and moves along the flow passage; and a damper made of an elastic material that is disposed at one end of the plunger facing the end of the core, and comes into contact with the end of the core by movement of the plunger.

12 Claims, 6 Drawing Sheets

(56) References Cited

U.S. PATENT DOCUMENTS

| | | | | |
|---|---|---|---|---|
| 5,083,590 A * | 1/1992 | Gattolliat | ............... | F04B 49/24 |
| | | | | 137/596.17 |
| 6,220,275 B1 * | 4/2001 | Nishinosono | ....... | F16K 31/0606 |
| | | | | 137/238 |
| 2005/0115618 A1 * | 6/2005 | Kumar | ................ | F16K 31/0679 |
| | | | | 137/613 |

FOREIGN PATENT DOCUMENTS

| | | | |
|---|---|---|---|
| JP | 2000-291707 A | 10/2000 |
| JP | 2005-351436 | 12/2005 |
| KR | 10-2011-0056990 A | 5/2011 |
| KR | 10-2012-0118202 | 10/2012 |
| KR | 10-2013-0022387 A | 3/2013 |
| KR | 10-2014-0137040 | 12/2014 |
| KR | 10-1553528 | 9/2015 |

* cited by examiner

PNEUMATIC VALVE FOR VEHICLE

CROSS-REFERENCE TO RELATED APPLICATION

This application claims priority to and the benefit of Korean Patent Application No. 10-2015-0141268, filed on Oct. 8, 2015, which is incorporated herein by reference in its entirety.

FIELD

The present disclosure relates to a pneumatic valve for a vehicle, and more particularly, to a pneumatic valve for a vehicle which can reduce operating noise and inhibit deterioration of performance.

BACKGROUND

The statements in this section merely provide background information related to the present disclosure and may not constitute prior art.

More pneumatic devices are used to control various devices, and more actuators are applied to pneumatic valves.

Actuators in the pneumatic valve have been developed to inhibit occurrences of noise and vibration caused by their operation.

Matters described as the background art should not be recognized as corresponding to the already known prior arts by those skilled in the art.

SUMMARY

An aspect of the present disclosure is to provide a pneumatic valve for a vehicle which reduces the noise and vibration generated when a plunger of an actuator and a core come into contact with each other, and eliminates a phenomenon in which a spring is interposed, while protruding in an outward direction, between a movement space of the plunger and the core, while a core unit spring is combined, thereby being able to inhibit or prevent operating noise.

According to a first aspect of the present disclosure, there is provided a pneumatic valve for vehicle which includes a valve housing having a flow passage through which air flows; a core fixed to the center of the flow passage; a plunger that is disposed to face at least one end of both ends of the core and moves along the flow passage; and a damper made of an elastic material that is disposed at one end of the plunger facing the one end of the core, and comes into contact with one end of the core by movement of the plunger. In particular, the damper has a protruding portion that protrudes in an outer peripheral direction from an end portion being in contact with the one end of the core, and a storage space is formed between the protruding portion of the damper and the plunger, the protruding portion being inserted in the storage space when the protruding portion is deformed by the contact pressure.

In one form, the plunger has a jaw that supports the end portion of the protruding portion, and an inclined surface spaced apart from the jaw at a preset interval in a state in which the damper is supported by the jaw, and the storage space may be formed by the jaw, the inclined surface and the protruding portion.

In another form, the valve housing has an inlet hole formed in an inlet portion of its one end, and an outlet hole and a relief hole formed in an outlet portion of the other end, the plunger includes an inlet plunger which slides in the flow passage of the valve housing to open and close the inlet hole, and a relief plunger that slides in the flow passage of the valve housing to open and close the relief hole, and the valve housing may further include an inlet coil provided outside the valve housing to allow the inlet plunger to slide by an electromagnetic force, and a relief coil that is provided outside the valve housing to cause the relief plunger to slide by the electromagnetic force.

The inlet hole and the relief hole may be opened and closed by the inlet plunger and the relief plunger respectively, and the outlet hole may maintain communications with the valve housing in an open state.

In another form, the pneumatic valve for vehicle may be a normally closed type in which the inlet plunger and the relief plunger are spaced apart each other, an elastic portion extending through the core portion is interposed between the inlet plunger and the relief plunger so as to press the inlet and relief plungers in opposite sides each other, thereby maintaining closing of the inlet hole and the relief hole in a normal status.

The inlet plunger may move back toward the central side of the valve housing upon operation of the inlet coil to open the inlet hole.

The relief plunger may move back toward the central side of the valve housing upon operation of the relief coil to open the relief hole.

In one form, an outer surface of the core is in close contact with an inner surface of the flow passage to separate the flow passage of the valve housing into one side and the other side, the core is formed with a passageway passing through the center such that the valve housing flow passages separated into one side and the other side may communicate with each other via the passageway.

The inlet plunger and the relief plunger may slide in a state in which the outer surface thereof is in contact with the inner surface of the flow passage of the valve housing.

In another form, the inlet plunger may be formed with an inlet flow passage groove indented to the inlet portion side at the end portion of the central side of the flow passage of the valve housing, the end portion of the inlet flow passage groove may communicate with the inlet portion through a through-hole, the relief plunger is formed with an outlet flow passage groove indented to the outlet portion side at the end portion of the central side of the flow passage of the valve housing, and the end of the outlet flow passage groove may communicate with the outlet portion through a through-hole.

In yet another form, the damper is disposed at an end portion of the flow passage of the inlet plunger and the relief plunger respectively, the end portions are disposed in a center portion of the valve housing, and the elastic portion may be interposed between the dampers to bias the inlet plunger and the relief plunger to the opposite sides each other.

The elastic portion includes a spring, the spring includes both end portions corresponding to portions in which at least one of the inlet plunger or the relief plunger, and the core come into contact with each other, and a central portion between the both end portions, the both end portions are wound in a substantially incompressible state, and the central portion may be wounded in a state of providing an elastic force to both sides.

In another form, the elastic portion may include: both end structures disposed at a position where the at least one of the inlet plunger or the relief plunger, and the core come into contact with each other; and a spring connecting the both end structures and configured to provide elastic force in a direction to the both end structures.

According to the pneumatic valve for a vehicle having the aforementioned means for solving the problems, by installing a damper made of an elastic material on the core side end portion of the plunger, and by further adding a storage space capable of allowing the deformation of the core by pressure added after contact between the damper and the core, it is possible to further improve the effect of the shock-absorbing and noise reduction obtained by the damper.

Further, according to the pneumatic valve, through the structural characteristics of the elastic portion interposed between the two plungers through the core, it is possible to inhibit or prevent the catching phenomenon which may occur when a simple spring entirely wound at regular intervals is applied, and it is possible to inhibit or prevent the operating noise and actuator malfunction due to the catching phenomenon.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a pneumatic valve for vehicle according to various forms of the present disclosure will be described with reference to the accompanying drawings.

Adjusting devices capable of supporting a waist/a flank/a hip of a passenger using a pneumatic device are applied to a vehicle seat. The pneumatic valve of the present disclosure has a bidirectional integral structure and an easily expandable structure, and can be applied to the vehicle pneumatic adjusting devices as follows. For example, one form of the present disclosure can be applied to a lumbar support (a waist support), a bolster adjusting device (flank/thigh), a cushion adjusting device (hip/thigh), and a massage system (whole body relax).

In one form of the present disclosure, by integrating the inlet/outlet actuators to remove a flow passage and a connection part desired at the time of application of the independent actuator structure, it is possible to simplify and share desired components, which can contribute to effects such as weight/size/cost reductions.

When voltage is applied to an inlet coil, an inlet plunger moves in the direction of the core to open the inlet port, and the pneumatic pressure is supplied through the outlet hole, and at the time of applying voltage to a relief coil, the relief plunger moves in the direction of the core to open the relief hole.

The present disclosure is an expandable valve structure in which additional valves can be assembled to expand through connecting structure located on outer surface of each valves. By connecting and fixing valves via the connection structure, addition of valves is easily achieved, and it is possible to inhibit or prevent the air leakage of the coupled valves and acquire reliability of the valves (see FIG. 3).

Moreover, in applying the pneumatic valve to a seat, in some cases, there is a need for a precise pressure control depending on the characteristics of the system, rather than a simple flow control. In one form, it is possible to insert/attach a pressure sensor to the valve housing, thereby allowing the pressure control, without separately changing the valve (e.g., pneumatic pressure adjustment controller and a solenoid actuator integral structure may be applied).

In particular, when the core as the fixing portion and the plunger as the moving portion of the pneumatic valve come into contact with each other, it is possible to reduce noise, while the damper of elastic material fixedly arranged on the plunger is compressed. In particular, it is possible to more effectively remove the impact and noise at the time of contact, by providing a space between a region of the plunger and the damper in which the damper deformed by the urged force may be inserted.

Further, in one form, a simple spring type is provided. For example, the spring may have a particular form of winding to address a problem that the winding of the spring is caught between the plunger and the core when the elastic portion interposed between both plungers of the pneumatic valve is provided.

Referring to FIGS. 1 to 4, the pneumatic valve for vehicle includes: a valve housing 100 that has an inlet hole 132 formed in an inlet portion 130 of its one end, an outlet hole 144 and a relief hole 142 formed in an outlet portion 140 of the other end, and a flow passage through which air flows formed therein; an inlet plunger 200 which slides in the flow passage of the valve housing 100 to open and close the inlet hole 132; a relief plunger 300 that slides in the flow passage of the valve housing 100 to open and close the relief hole 142; an inlet coil 600 that is provided outside the valve housing 100 to cause the inlet plunger 200 to slide by an electromagnetic force; and a relief coil 700 that is provided outside the valve housing 100 to cause the relief plunger 300 to slide by the electromagnetic force.

Figure 2:
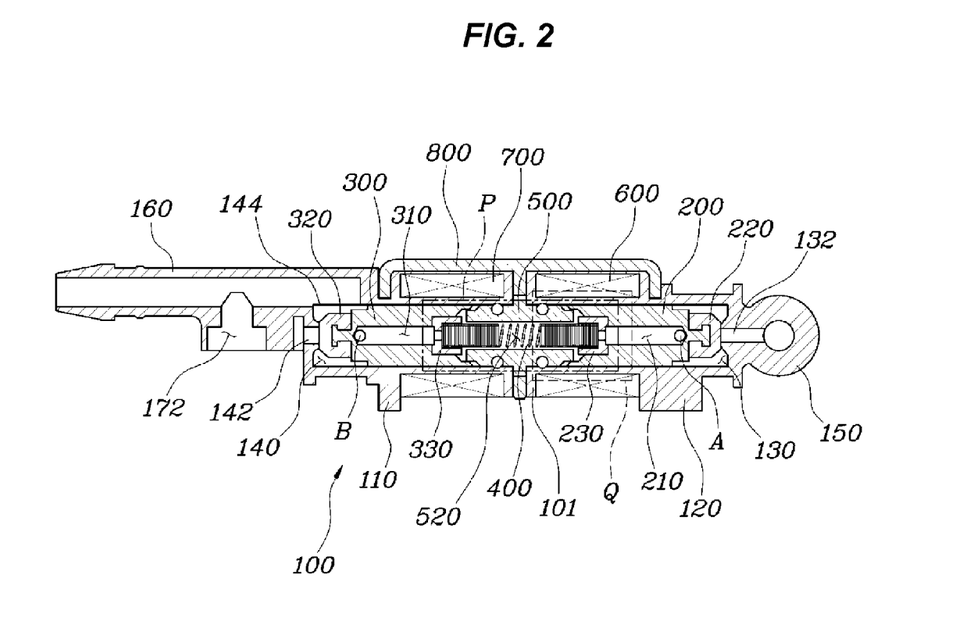
FIG. 2 is a cross-sectional view taken along line II-II of FIG. 1.

As illustrated in FIG. 2, in the valve housing 100, the inlet hole 132 is formed in the inlet portion 130 at one end, the outlet hole 144 and the relief hole 142 are together formed in the outlet portion 140 at the other end, and a flow passage through which air flows is formed inside.

The valve housing 100 is divided into one side part 110 and the other side part 120 as illustrated in FIG. 2. The one side part 110 and the other side part 120 are coupled to each other so as to be wrapped by a fixing housing 800 on the outside in a state in which the flow passages abut with each other to be connected to each other, and coupling between the one side part 110 and the other side part 120 can be fixed.

Figure 3:
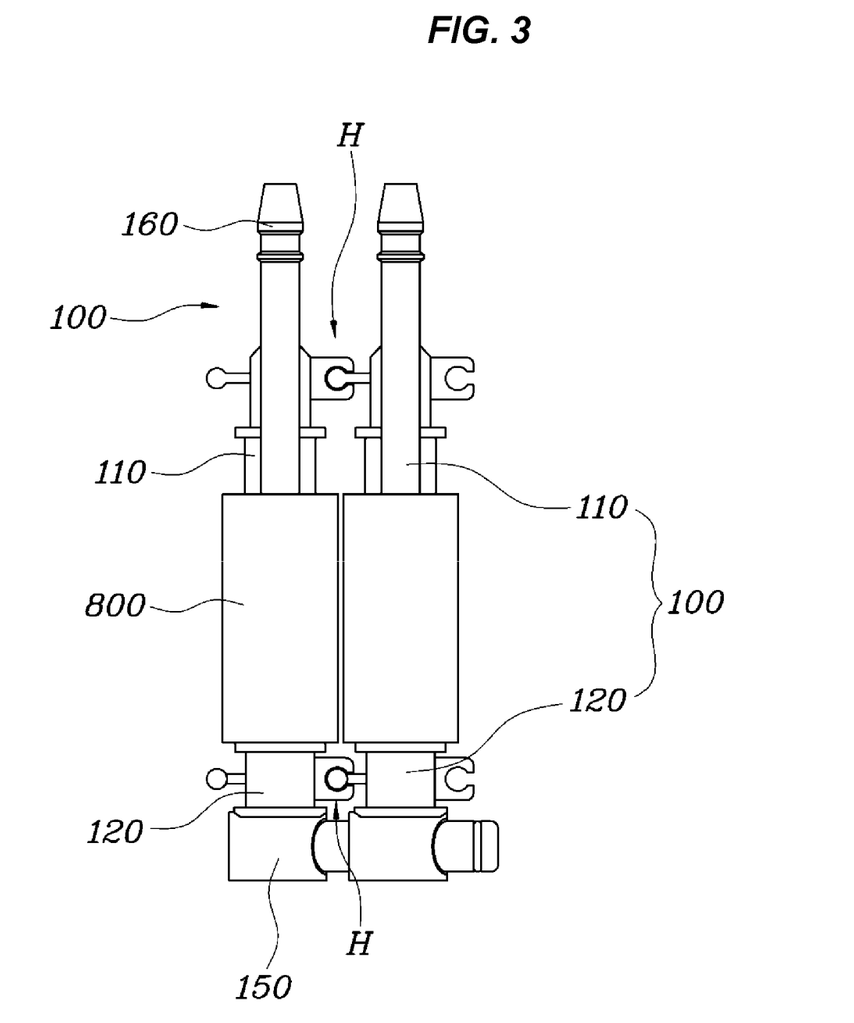
FIG. 3 is a state diagram obtained by observing a pneumatic valve for vehicle of FIG. 1 from the top, in which only two valve housings are connected.

Further, the inlet hole 132 and the outlet hole 144 of the valve housing 100 are formed at both end portions. The inlet hole 132 and the outlet hole 144 are formed with an inlet nipple 150 and an outlet nipple 160, respectively. The inlet nipple 150 is formed to be laterally bent or extended so that the inlet nipple 150 of a first valve housing may be connected to another inlet nipple of a second valve housing to communicate with each other when the first and second valve housings are arranged in parallel to each other, as illustrated in FIG. 3. When the inlet nipple 150 is bent on both sides and is configured into a T-shape as illustrated in FIG. 3, the final end portion which is not connected to another inlet nipple can be finished by being blocked by a stopper or the like.

Further, a pneumatic sensor 170 can be installed on the outlet nipple 160 of the valve housing 100 through a mounting hole 172. Thus, by measuring the pressure on the outlet side, it is possible to accurately control the pressure.

Meanwhile, as illustrated in FIG. 3, in the inlet nipple 150 of the plurality of valve housings 100, in a state of being connected to each other, the final inlet nipple 150 is connected to a compressor, each relief hole 142 communicates with the atmosphere, and each of the outlet nipples 160 may be connected to the respective expansion objects. Accordingly, it is possible to individually control the expansion objects such as a plurality of cushions, using a single compressor.

Further, a hook structure H as the connecting structure is formed on the side surface of the valve housing 100, and can be mutually fastened to a hook structure of the side surface of adjacent another valve housing. Thus, regardless of the number of expansion objects, it is possible to construct a share system.

The hook structure H can be formed on each of the inlet side and the outlet side, and can be made up of a hook-like male portion and a groove-like female portion. In the case of the male portion, if any one male portion of the inlet side and the outlet side has an annular shape bent upward, another male portion is formed in an annular shape bent downward. Thus, rotation of the valve housing is inhibited or prevented in a state in which the two hook structures are fastened.

Further, the inlet plunger 200 slides in the internal flow passage of the valve housing 100 so as to open and close the inlet hole 132, and the relief plunger 300 slides in the flow passage of the valve housing 100 so as to open and close the relief hole 142.

The inlet hole 132 and the relief hole 142 are opened and closed by the inlet plunger 200 and the relief plunger 300, and the outlet hole 144 can always communicate with the flow passage of the valve housing 100 in an open state.

Specifically, as illustrated in FIG. 2, the inlet plunger 200 and the relief plunger 300 are disposed in a state of being spaced apart each other, an elastic portion 400 is interposed therebetween (e.g., between the inlet plunger 200 and the relief plunger 300) so as to press the inlet plunger 200 and the relief plunger 300 in opposite directions, and thus the inlet hole 132 and the relief hole 142 are closed in a normal status.

Further, because the inlet plunger 200 is arranged in a state of being relatively biased to the inlet hole 132 side as compared to the inlet coil 600, at the time of operation of the inlet coil 600, the inlet plunger 200 is moved back to the center side of the housing 100, and the inlet hole 132 can be opened. Further, because the relief plunger 300 is disposed in a state of being relatively biased to the relief hole 142 side as compared to the relief coil 700, at the time of operation of the relief coil 700, the relief plunger 300 is moved back to the center side of the housing 100, and the relief hole 142 can be opened.

Further, the inlet plunger 200 is formed with an inlet flow passage groove 210, and the end portion of the inlet passage groove 210 may communicate with the inlet portion 130 through a through-hole A. Further, the relief plunger 300 is formed with an outlet flow passage groove 310, and the end portion of the outlet flow passage groove 310 may communicate with the outlet portion 140 through a through-hole B.

Meanwhile, buffer portions 220, 320 made of an elastic material are respectively provided at the outer end portions of the flow passages of the inlet plunger 200 and the relief plunger 300, and the buffer portions 220, 320 can close the inlet hole 132 and the relief hole 142. Accordingly, noise and vibration caused by the operation are alleviated.

Figure 4:
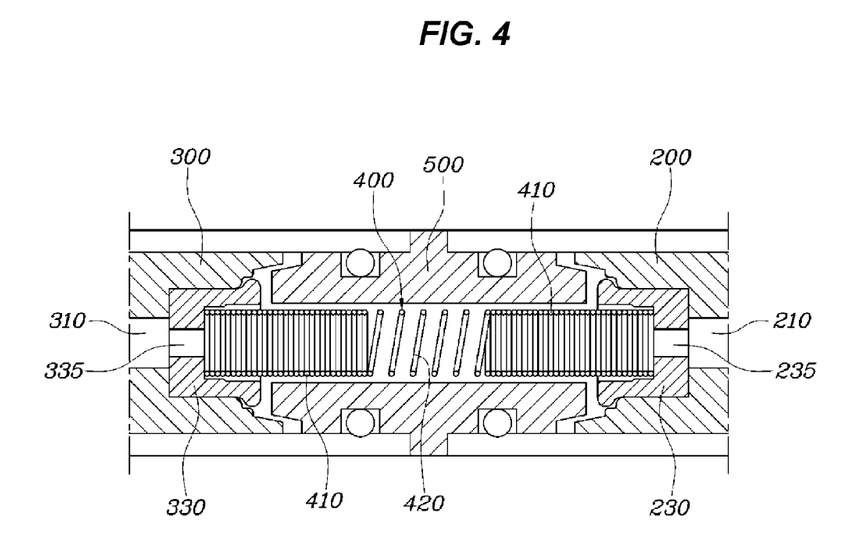
FIG. 4 is an enlarged cross-sectional view illustrating a region indicated by "P" of FIG. 2.

In particular, dampers 230, 330 made of an elastic material are provided at the end portion of the flow passage of the inlet plunger 200 and the relief plunger 300 respectively. As illustrated in FIGS. 2 and 4, the end portions are disposed in a center portion of the valve housing 100, facing each other. The elastic portion 400 is interposed between the dampers 230, 330 to urge the inlet plunger 200 and the relief plunger 300 in the opposite directions. The operating noise and vibration can be improved accordingly.

The dampers 230, 330 may be provided with air passages 235 or 335 for allowing the passage of the air at the center.

Further, the urging force of the elastic portion 400 can be enlarged at the time of operation of any one side of the inlet plunger 200 and the relief plunger 300 through such a structure, and the closing force of the side can be further strengthened.

Further, an inlet coil 600 is provided outside the valve housing 100 to allow the inlet plunger 200 to slide by an electromagnetic force, and a relief coil 700 is provided outside the valve housing 100 to allow the relief plunger 300 to slide by the electromagnetic force.

Further, a core 500 is provided in the central flow passage of the valve housing 100, and the outer surface of the core 500 comes into close contact with the inner surface of the flow passage to be able to separate the flow passage into one side and the other side.

Then, the core 500 is formed with a passageway 520 passing through the center, such that the flow passages of the valve housing 100 separated into one side and the other side can communicate with each other via the passageway.

Meanwhile, the inlet plunger 200 and the relief plunger 300 can slide in a state in which the outer surface is in contact with the inner surface of the flow passage.

According to such a configuration, when the inlet plunger 200 by the inlet coil 600 operates, the inlet plunger 200 slightly slides to the left side in FIG. 2. The inlet plunger 200 slides to the left side by a small space formed between the inlet plunger 200 and the core 500. Basically, the inlet plunger 200 forms a fully sealed state with the inner surface of the valve housing 100. When the inlet plunger 200 slides, the inlet portion 130 is filled with the pneumatic pressure from the inlet nipple 150, and the pneumatic pressure is introduced into the inlet flow passage groove 210 of the inlet plunger 200 via the through-hole A.

Further, after the pneumatic pressure is moved to the relief plunger 300 side via the inlet flow passage groove 210 of the inlet plunger 200 and via the passageway 520 of the core 500, the pneumatic pressure goes to the outlet portion 140 via the through-hole B along the discharge flow passage groove 310 of the relief plunger 300, and then is supplied to the expansion object through the outlet hole 144. Accordingly, the desired inlet plunger 200 is selected and controlled to expand a desired particular expansion object.

Meanwhile, in order to lower the pressure of the particular expansion object, the relief plunger 300 corresponding thereto is operated. When the relief coil 700 operates, the relief plunger 300 slightly slides to the right side in FIG. 2, and in that case, the pneumatic pressure of the outlet portion 140 is discharged to the outside through the relief hole 142. In this case, the inlet plunger 200 closes the inlet hole 132, the pneumatic sensor 170 measures the pneumatic pressure of the outlet portion 140 to indirectly measure the pressure of the expansion object and control the relief.

Meanwhile, FIG. 3 illustrates the fastened state of a plurality of valves, the valve housing 100 is divided into one side part 110 and the other side part 120, a fixing housing 800 is coupled to wrap around the outside of the one side part 110 and the other side part 120, in a state in which flow passages are in contact with each other to be connected, and thus, the coupling of the one side part 110 and the other side part 120 can be fixed.

Then, an inlet nipple 150 and an outlet nipple 160 are formed in each of the inlet hole 132 and the outlet hole 144 of the valve housing 100, and the inlet nipple 150 is formed to be laterally bent and can be fastened to communicate with the inlet nipple of adjacent another valve housing.

In a state in which the inlet nipples 150 of a plurality of valve housings 100 are connected to each other, the final inlet nipple 150 is connected to the compressor, each of the relief holes 142 communicate with the atmosphere, and each of the outlet nipples 160 may be connected to the each of the expansion object.

A hook structure H is formed on the side surface of the valve housing 100, and can be fastened to the hook structure of the side surface of adjacent another valve housing.

Figure 1:
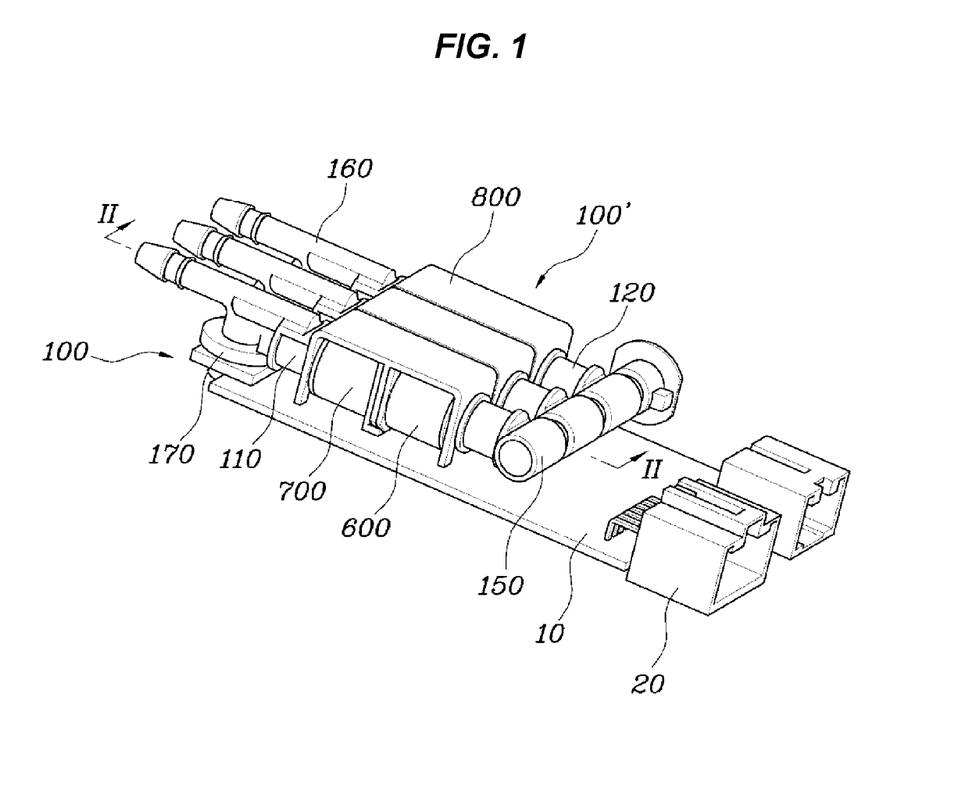
FIG. 1 is a perspective view of a pneumatic valve for vehicle.

Further, as illustrated in FIG. 1, the plurality of pneumatic valves is completed by being fixed to a single substrate 10, and by being electrically connected to a plurality of connectors installed in the substrate 20.

On the other hand, as illustrated in FIGS. 4 to 7, the dampers 230, 330 are provided, and the elastic portion 400 is interposed in a contact region between the plungers 200, 300 and the core 500.

Referring to FIG. 4, as mentioned above, at the end portions of the flow passage center sides facing each other of the inlet plunger 200 and the relief plunger 300, the dampers 230, 330 made of an elastic material are provided, and the elastic portion 400 is interposed between the dampers 230, 330 such that the inlet plunger 200 and the relief plunger 300 can be urged to the opposite sides.

Figure 5:
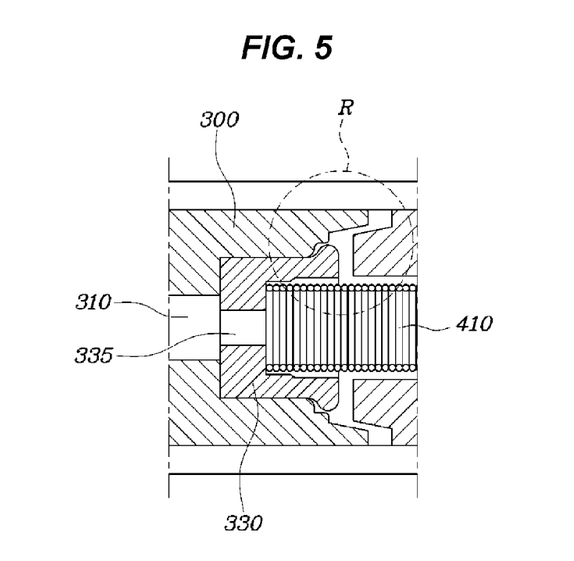
FIG. 5 is an enlarged cross-sectional view illustrating a region indicated by "Q" of FIG. 2.
Figure 6:
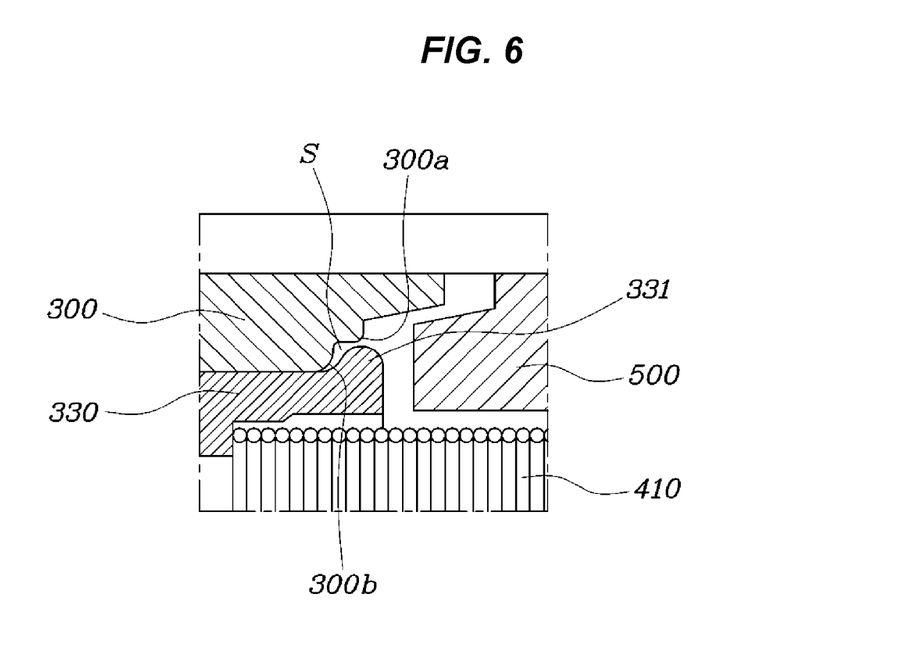
FIG. 6 is an enlarged cross-sectional view illustrating a region indicated by "R" of FIG. 5, illustrating a state in which a relief plunger is not urged by the core.
Figure 7:
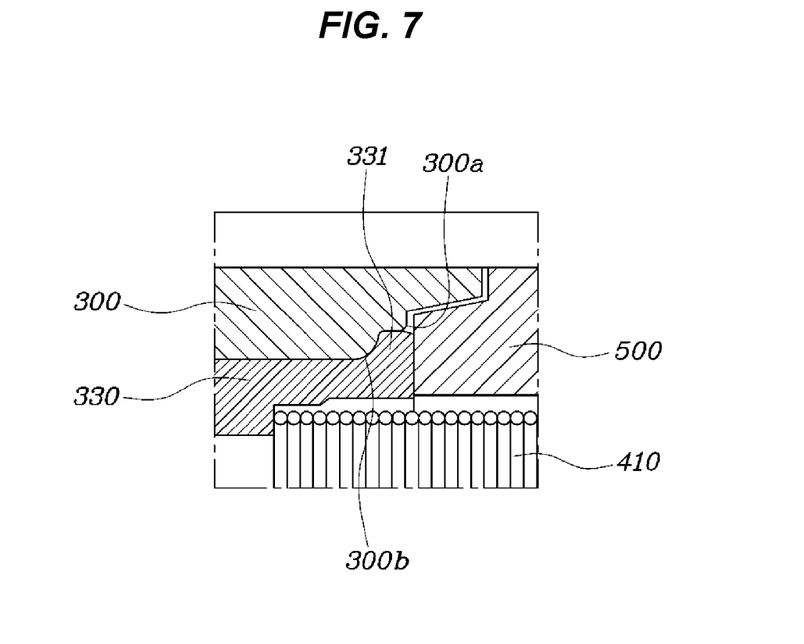
FIG. 7 is a diagram in comparison to FIG. 6, illustrating a state in which the relief plunger is urged to the core.

In particular, as illustrated in FIGS. 5 to 7, the damper 330 has a protruding portion 331 that protrudes in the outer peripheral direction, at the end portion coming into contact with one end of the core 500. Further, between the protruding portion 331 of the damper 330 and the plunger 300 in which the damper 330 is installed, a storage space S is provided in which the protruding portion 331 is inserted when the protruding portion 331 is deformed by the contact pressure.

By further adding a storage space S capable of permitting the deformation of the damper 330 by the pressure added after the contact, in addition to simply eliminating the impact of the contact with the core 500 by the damper 330 made of an elastic material, it is possible to further improve the effects of the shock-absorbing and noise reduction provided by the damper 330.

More specifically, as illustrated in FIG. 6, the plunger 300 has a jaw 300a for supporting the end portion of the protruding portion 331 of the damper 330, and an inclined surface 300b spaced apart from the jaw 300a at a preset interval. The storage space S may be formed by the jaw 300a, the inclined surface 300b and the protruding portion 331. Such a structure is a structure formed in a state in which the plunger 300 is not subjected to the external force in the direction of the core 500.

In the state illustrated in FIG. 6, when an external force in the direction of the core 500 is applied to the plunger 300, the protruding portion 331 of the damper 330 can be pushed and seated into the storage space S as illustrated in FIG. 7, while being deformed by crimping. It is possible to further reduce the contact shock and noise with the core 500 through the deformation and seated process of the damper 230.

Of course, it is desirable that such a configuration be similarly applied among the inlet plunger 200, the damper 230 and the core 500.

Further, it is possible to address the problem that a spring winding constituting the elastic portion 400 is caught when the plungers 200, 300 come into contact with the core 500 through the structural features of the elastic portion 400.

When the elastic portion 400 is provided by a simple spring having a general wide winding interval, there may be a problem that which the spring winding is caught between the plungers 200, 300 and the core 500 by an unintended external force.

Figure 8:
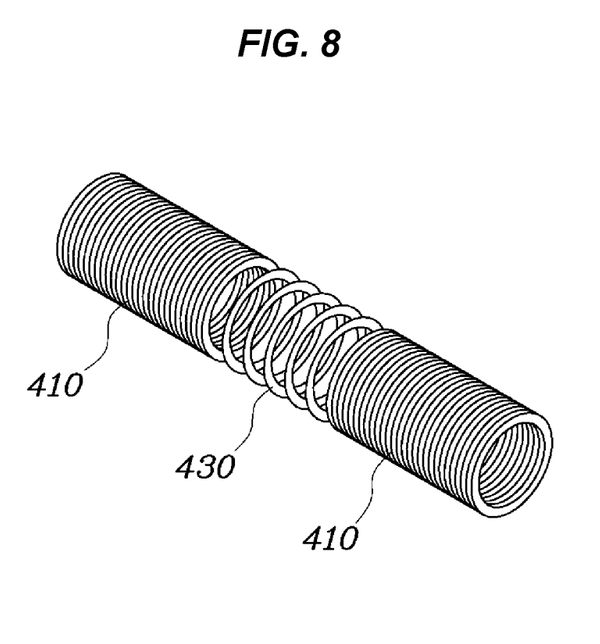
FIG. 8 is a diagram illustrating a first form of the elastic portion applied to the pneumatic valve for vehicle.

In order to address this problem, as illustrated in FIG. 8, the elastic unit 400 may be provided by a spring having a special winding structure. More specifically, the spring constituting the elastic portion 400 includes both end portions 410 corresponding to the contact portion between the plungers 200, 300 and the core 500, and a central portion 430 between the both end portions 410. The both end portions 410 can be very tightly wounded in a substantially incompressible state. It is possible to address the problem of catching of a part of the spring winding between the plungers 200, 300 and the core 500, through the structure of the both end portions 410. Instead, the central portion 430 can provide an elastic force of pushing the plunger to both side directions by being wound at a pre-set interval.

Figure 9:
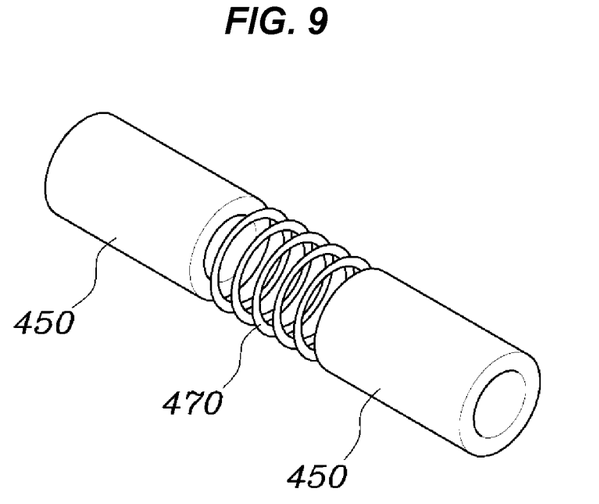
FIG. 9 is a diagram illustrating a second form of the elastic portion capable of replacing the elastic portion of FIG. 8.

As another structure for providing the elastic portion 400, as illustrated in FIG. 9, it is possible to suggest a structure in which the elastic portion 400 has both end structures 450, and a spring 470 connected therebetween. Both end structures 450 is configured to be connected to both ends of the spring 470 in a simple cylindrical form.

Through the structure as illustrated in FIGS. 8 and 9, it is possible to inhibit or prevent a catching phenomenon which may occur when the simple springs entirely wound at regular intervals are applied, and it is possible to prevent the operating noise and actuator malfunction due to the catching phenomenon.

While the present disclosure has been described and illustrated with reference to specific forms, it is obvious to those skilled in the art that the present disclosure may be variously improved and changed within the scope that does not depart from the technical idea of the present disclosure.

What is claimed is:

1. A pneumatic valve for a vehicle, comprising:
   a valve housing having a flow passage through which air flows;
   a core fixed to a center of the flow passage;
   a plunger that is disposed to face at least one end of the core and configured to move along the flow passage; and
   a damper made of an elastic material that is disposed at one end of the plunger facing the at least one end of the core, and configured to contact with one end of the core by movement of the plunger,
   wherein the damper has a protruding portion that protrudes in an outer peripheral direction from an end portion being in contact with the one end of the core, and a storage space is formed between the protruding portion of the damper and the plunger so that the protruding portion is inserted in the storage space when the protruding portion is deformed by contact pressure,
   wherein the valve housing has an inlet hole formed in an inlet portion at a first end of the valve housing, and an outlet hole and a relief hole formed in an outlet portion at a second end of the valve housing, and a relief coil and an inlet coil which are provided outside the valve housing,
   wherein the plunger comprises an inlet plunger configured to slide in the flow passage of the valve housing to open and close the inlet hole, and a relief plunger configured to slide in the flow passage of the valve housing to open and close the relief hole, and
   wherein the inlet coil is configured to allow the inlet plunger to slide by an electromagnetic force, and the relief coil is configured to cause the relief plunger to slide by the electromagnetic force.

2. The pneumatic valve for a vehicle of claim 1, wherein the plunger has a jaw configured to support an end portion of the protruding portion, and an inclined surface spaced apart from the jaw at a preset interval in a state in which the damper is supported by the jaw, and the storage space is formed by the jaw, the inclined surface and the protruding portion.

3. The pneumatic valve for a vehicle of claim 1, wherein the inlet hole and the relief hole are opened and closed by the inlet plunger and the relief plunger respectively, and the outlet hole is configured to maintain communication with the valve housing in an open state.

4. The pneumatic valve for a vehicle of claim 1, wherein the inlet plunger and the relief plunger are spaced apart each other, an elastic portion configured to extend through the core portion is interposed between the inlet plunger and the relief plunger so as to press the inlet plunger and the relief plunger in an opposite direction to each other, and to maintain closing of the inlet hole and the relief hole in a normal status.

5. The pneumatic valve for a vehicle of claim 4, wherein the inlet plunger is configured to move back towards a central side of the valve housing upon operation of the inlet coil to open the inlet hole.

6. The pneumatic valve for a vehicle of claim 4, wherein the relief plunger is configured to move back toward a central side of the valve housing upon operation of the relief coil to open the relief hole.

7. The pneumatic valve for a vehicle of claim 4, wherein an outer surface of the core is configured to contact with an inner surface of the flow passage to separate the flow passage of the valve housing into one side and the other side, and the core is formed with a passageway passing through a center such that the valve housing flow passages separated into the one side and the other side communicate with each other via the passageway.

8. The pneumatic valve for a vehicle of claim 4, wherein the elastic portion comprises a spring, the spring comprises both end portions corresponding to portions in which at least one of the inlet plunger or the relief plunger, and the core come into contact with each other, and a central portion between the both end portions, the both end portions are wound in a substantially incompressible state, and the central portion is wounded in a state of providing an elastic force to both sides.

9. The pneumatic valve for a vehicle of claim 4, wherein the elastic portion comprises both end structures disposed at a position in which at least one of the inlet plunger or the relief plunger, and the core contact with each other, and a spring connecting the both end structures and configured to provide an elastic force in a direction to the both end structures.

10. The pneumatic valve for a vehicle of claim 1, wherein the inlet plunger and the relief plunger slide in a state in which an outer surface of the inlet plunger and the relief plunger is in contact with an inner surface of the flow passage of the valve housing.

11. The pneumatic valve for a vehicle of claim 1, wherein the inlet plunger is formed with an inlet flow passage groove indented to an inlet portion side from an end portion of a central side of the flow passage of the valve housing, and an end portion of the inlet flow passage groove is configured to communicate with the inlet portion through a through-hole, and
   wherein the relief plunger is formed with an outlet flow passage groove indented to an outlet portion side from an end portion of a central side of the flow passage of the valve housing, and an end portion of the outlet flow passage groove is configured to communicate with the outlet portion through a through-hole.

12. The pneumatic valve for a vehicle of claim 1, wherein the damper is disposed at an end portion of the flow passages of the inlet plunger and the relief plunger respectively, the end portions are disposed in a center portion of the valve housing, and the elastic portion is interposed between the dampers to bias the inlet plunger and the relief plunger to opposite sides each other.

* * * * *